UNITED STATES PATENT OFFICE.

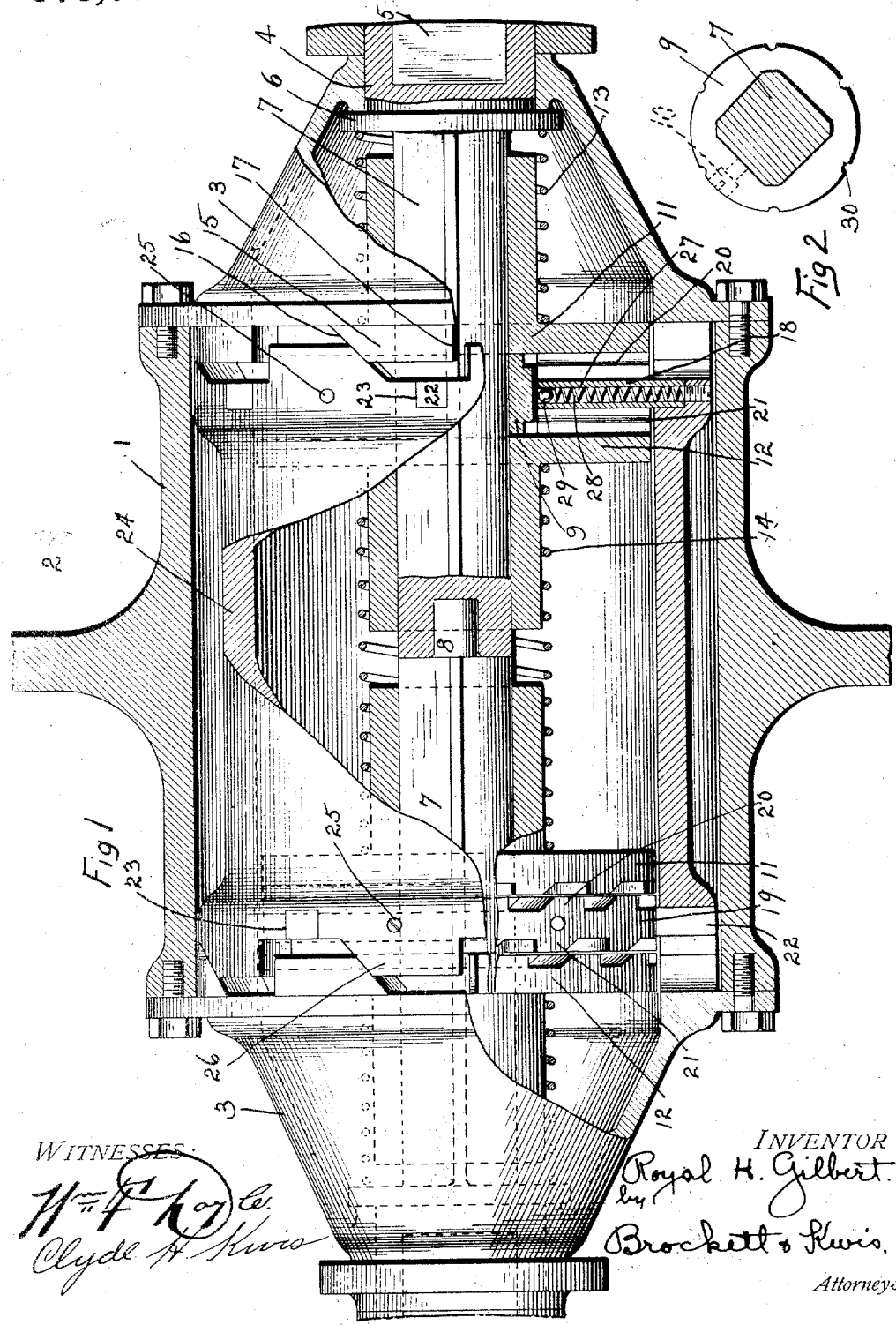

ROYAL H. GILBERT, OF LAKEWOOD, OHIO.

DRIVING-GEARING.

973,031.  Specification of Letters Patent.  Patented Oct. 18, 1910.

Application filed February 1, 1909. Serial No. 475,329.

*To all whom it may concern:*

Be it known that I, ROYAL H. GILBERT, a citizen of the United States, residing at Lakewood, in the county of Cuyahoga and State of Ohio, have invented certain new and useful Improvements in Driving-Gearing, of which the following is a specification.

This invention relates to improvements in the driving mechanism for motor vehicles and the like and is particularly designed as an improvement over the construction shown in my prior applications No. 358,229 filed Feb. 19, 1907 and No. 366,957 filed April 8, 1907, both wherein a member associated with the rear axle causes the coupling of the wheels to the driving member so as to be driven thereby in either of its directions of rotation, and further whereby when one wheel or one member driven by the axle or shaft is required to move faster than the other that it may automatically release itself from the driving mechanism and rotate freely while the driving mechanism may continue to drive the other shaft, wheel or member.

The present invention relates more particularly to the arrangement and construction of the several parts at substantially the center of the rear axle whereby the axle sections may be readily disconnected and removed from the driving mechanism without interfering with the relationship or adjustment of such driving mechanism.

More specifically the invention relates to a suitable housing adapted to receive or to have secured to it, the main driving gear or sprocket which is operated by the motor and preferably upon the inside of such housing to be provided with suitable cams which coöperate with other cams in shifting an internal member which in turn is provided with suitable drive coupling members adapted by the movement of such internal member to be brought into engagement with the forward or reverse coupling devices which are mounted upon the squared ends of shaft driving members which are rotatably mounted in the main housing and the operation is such that upon the driving of the main gear and housing, the inner member is shifted in one direction or the other causing the coupling members carried thereby to be thrown into engagement with the forward or reverse coupling members carried by the shaft members according to the direction of rotation of the housing.

The invention may be further briefly summarized as consisting in the construction and combinations of parts as hereinafter set forth in the specification, drawings and claims.

Referring to the drawings, Figure 1 is a side elevation of the device with portions broken away to more clearly show the internal mechanism thereof and with portions of the internal mechanism broken away and Fig. 2 is a detail view showing some of the parts in detail.

In carrying out my invention any preferred form and construction of parts may be employed so long as they possess the necessary features, but I have shown one form in the drawings which meets the requirements very effectively and in such embodiment 1 represents the main housing provided with a member 2 for receiving the main driving gear or sprocket. Secured to the ends of this housing are bearing members 3 in the ends of which are mounted the shaft driving members 4, each of which is provided with a squared opening 5, opening out at the end of the housing, a flange 6 adapted to engage the inside of the bearing members, and further with a squared end 7 extending within the housing. One of these two squared ends 7 of the shaft drive members is provided centrally with a pin 8 which telescopes into a suitable opening in the other for insuring the proper alinement of one with respect to the other. Each of the squared ends 7 of the axle members is provided with a collar 9 having a squared opening therein for receiving the squared ends 7 and with a set screw 10 for holding the collar against endwise movement upon the squared ends 7. Each squared end is further provided with two clutch members 11 and 12 which are slidably mounted upon the squared end and are held against the sides of the collar 9 by means of a spring 13 mounted between the flange 6 and the clutch member 11, and a spring 14 mounted between the clutch member 12 of one squared end 7 and the clutch member 11 of the other squared end. By this arrangement it will be seen that the clutch members 11 and 12 are yieldingly held against the collar 9 of the right-hand squared end 7, as shown in the drawing, and the other clutch members 11 and 12 are yieldingly held against the collar 9 of the left-hand squared end 7, as shown.

Each of the bearing members 3 is provided within the housing 1 with inwardly projecting cam lugs 15, in a circular arrangement, and each of these lugs has a cam face 16 and an abrupt shoulder 17, and the arrangement is such that their cam faces 16 are similarly located throughout the circular arrangement but the cam faces of one bearing member are in the reverse direction with respect to the cam faces of the other bearing member for a purpose which will hereinafter appear.

Rotatably mounted upon the collar 9 are driving clutch members 18 and 19, one for each axle driving section and each is provided upon its side faces with teeth 20 and 21, the teeth 20 being turned in a reverse direction to the teeth 21 on each clutch member. These driving clutch members are further provided with squared radial projections 22 which fit into squared openings 23 in the cam member 24 which is secured to the driving clutch members by means of suitable screws or bolts 25. The driving clutch members are of less thickness than the space between the corresponding clutch members 11 and 12 whereby the clutch teeth on one side thereof will be out of mesh before the teeth on the other side move into mesh. Upon both edges of this cam member 24 are cams 26 which are arranged to coöperate with the cam lugs 15 carried by the bearing members, and these cams 26 may be said to be similar in all respects to the cam lugs with which they coöperate. These cams and cam lugs are always in mesh.

The relative movement of the cams carried by the cam member 24 and the cam lugs carried by the bearing members 3 is such that when the housing 1 is rotated in one direction, the cam faces 16 of the cam lugs engage similar faces of the cams carried by the cam member causing the latter to be shifted in one direction, and causing the driving clutch members 18 and 19 to be shifted likewise so that one set of their clutch teeth are brought into engagement with one pair of the clutch members 11—11 and 12—12 causing the driving of the axle drive members in one direction; while upon the rotation of the housing in the opposite direction, the cam faces 16 of the opposite cam lugs coöperate with similar faces of the cams carried by the cam member and bring about the shifting of the latter in the opposite direction and the coupling of the remaining pair of the clutch members 11—11 and 12—12.

To give the operation of the device with respect to a definite rotation of the housing 1, let us assume that the housing is rotating in a clockwise direction when viewed from the right end of Fig. 1. This rotation causes the cam faces 16 of the right-hand set of cam lugs to engage the similar faces of the cams carried by the cam member 24 and shift the latter to the left when the driving clutch members 18 and 19 will be shifted to the left also, and the teeth 21 of such driving clutch members will be brought into engagement with the teeth of the forward clutch members 12—12 and the squared ends 7 will be driven in a clockwise direction. If one squared end 7 or if one shaft member should be required to rotate at greater speed than the other; for example, if the wheel, which is coupled to the right-hand axle drive member should have to rotate faster than the left-hand wheel, then the right-hand clutch member 12 would give and its teeth would pass over the teeth of the driving clutch member 18. Upon the reverse rotation of the housing 1, the cam member 24 would be shifted in the opposite direction bringing about the coupling of the two sets of teeth 20 of the drive clutch members with the teeth of the reverse driving clutches 11.

In order to overcome the friction between the parts so that there will be a sufficient resistance or drag, as it were, to the cam member 24 so that the cam faces 16 may shift it in either direction, both of the driving clutch members 18 and 19 are provided with at least one opening 27 for the reception of a spring 28 which takes against a ball 29 adapted for engagement with recesses 30 in the periphery of the corresponding collar 9. By this arrangement sufficient tension is brought to bear upon the cam member so that it normally tends to rotate with the axles and not with the housing whereby when a rotation is set up by the housing, the cam member will be shifted.

Having described my invention, I claim:—

1. In a motor vehicle, in combination, a driving member, axle sections, forward and reverse coupling devices for each axle section, a driving coupling member coöperating with the coupling devices of each axle section, and means between said driving coupling members and said driving member and operated by the rotation of the latter for automatically shifting the driving coupling devices into engagement with the forward or reverse coupling devices of the two axle sections according to the direction of rotation of the driving member.

2. In a driving gear for motor vehicles, in combination, a driving member, axle sections, forward and reverse coupling members for each axle section, driving coupling devices adapted when in one position to coöperate with the forward coupling member of each axle section, and when in another position to coöperate with the reverse coupling device of each axle section, and means between said driving coupling devices and the driving member and operated by the rotation of the latter for shifting said driving coupling members into engagement with the forward or reverse coupling devices of the axle sections according to the direction of rotation of the driving member.

3. In a driving gear for motor vehicles, in combination, a driving member, axle sections, forward and reverse coupling members for each axle section, a driving coupling device for each axle section, a member secured to said drive coupling devices, and means between said member and the driving member and operated by the rotation of the latter for automatically shifting said member and the driving coupling devices carried thereby into engagement with the forward or reverse coupling devices carried by the axle sections in accordance with the direction of rotation of the driving member.

4. In a driving gear for motor vehicles, in combination, a driving member, axle sections, forward and reverse coupling devices for each axle section, a driving coupling member for each axle section and adapted to coöperate with the forward and reverse coupling devices of the corresponding axle section, a cam member secured to said driving coupling devices for shifting the same, and suitable cams between said cam member and the driving member and adapted by the rotation of the latter to shift the driving coupling members into engagement with such of the coupling devices of the axle sections as will cause the latter to be driven by the driving member in a forward or reverse direction according to its direction of rotation.

5. In a driving gear for motor vehicles, in combination, a driving member, axle driving sections, a forward and reverse coupling device for each axle driving section, a driving coupling device for each axle driving section and adapted to coöperate with the corresponding forward and reverse coupling devices, and means between said driving coupling devices and the driving member and actuated by the rotation of the latter for causing the driving coupling devices to be shifted into engagement with the forward or reverse coupling devices of the axle sections according to the direction of rotation of the driving member.

6. In a driving gear for motor vehicles, in combination, a driving member, axle sections, forward and reverse coupling devices for each axle section, a driving coupling member for each axle section and adapted to coöperate with the forward and reverse coupling devices of the corresponding axle section, a housing rotatably mounted upon said axle sections, a cam member secured to said driving coupling devices and adapted for shifting the same, cam lugs carried by said cam member, and cams carried by said housing and adapted by the rotation of the driving member to cause them to shift the cam member and the driving coupling members into engagement with such of the coupling devices of the axle sections as will cause the latter to be driven by the driving member in a forward or reverse direction according to its direction of rotation.

7. In a driving gear for motor vehicles, in combination, a driving member, axle sections, forward and reverse coupling devices for each axle section, a driving coupling member for each axle section and adapted to coöperate with the corresponding forward and reverse coupling devices of each axle section, cams carried by said driving member, a cam member secured to said driving coupling devices for shifting the same, and suitable cams carried by said cam member and coöperating with the cams carried by the driving member and adapted by the rotation of the latter to shift the driving coupling members into engagement with such of the coupling devices of the axle sections as will cause the latter to be driven by the driving member in a forward or reverse direction according to its direction of rotation.

8. In a driving gear for motor vehicles, in combination, axle driving sections, a housing rotatably mounted thereon, a driving member rigid with said housing, cams carried by said housing, a forward and reverse coupling device on each of said axle driving sections, a driving coupling device rotatably mounted upon each axle section and adapted to coöperate with the corresponding forward and reverse coupling devices, a cam member secured to said driving coupling members, and cams carried by said cam member and coöperating with the cams of said housing.

9. In a driving gear for motor vehicles, in combination, a pair of axle sections having squared portions, a housing rotatably mounted upon said axle sections, a driving member carried thereby, cams carried by said housing, a forward and reverse clutch device slidably mounted upon the squared end of each axle driving section, said forward and reverse clutch devices of each axle drive section having their clutch faces opposed to each other, a driving clutch member rotatably mounted between said clutch faces, a cam member secured to said drive clutch members, and cams carried by said cam member and adapted to coöperate with the cams carried by said housing.

In testimony whereof I affix my signature in presence of two witnesses.

ROYAL H. GILBERT.

Witnesses:
  E. J. THORABER,
  B. W. BROCKETT.